US 6,684,380 B2

(12) United States Patent
Rubin et al.

(10) Patent No.: US 6,684,380 B2
(45) Date of Patent: Jan. 27, 2004

(54) INTELLIGENT STRUCTURE SIMPLIFICATION TO FACILITATE PACKAGE ANALYSIS OF COMPLEX PACKAGES

(75) Inventors: Barry J Rubin, Croton-on-Hudson, NY (US); Erik J Breiland, Colchester, VT (US)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 10/113,702

(22) Filed: Apr. 1, 2002

(65) Prior Publication Data

US 2003/0188284 A1 Oct. 2, 2003

(51) Int. Cl.[7] .................. G06F 17/50; G06F 19/00; G06F 9/455
(52) U.S. Cl. ............... 716/11; 716/2; 700/121
(58) Field of Search .................. 716/1, 3, 4, 5, 716/11; 703/1, 2; 700/97, 98, 121

(56) References Cited

U.S. PATENT DOCUMENTS

| | | | | |
|---|---|---|---|---|
| 5,367,465 A | * | 11/1994 | Tazawa et al. ............... 700/98 |
| 5,377,118 A | * | 12/1994 | Leon et al. ................ 700/182 |
| 5,416,729 A | * | 5/1995 | Leon et al. .................. 716/20 |
| 5,515,293 A | * | 5/1996 | Edwards .................... 716/11 |
| 5,640,497 A | * | 6/1997 | Woolbright .................. 716/11 |
| 5,887,155 A | * | 3/1999 | Laidig ........................ 716/10 |
| 6,128,767 A | * | 10/2000 | Chapman ...................... 716/1 |

OTHER PUBLICATIONS

Michielssen et al., "Fast Algorithms for the Electromagnetic Simulation of Planar Structures," 1998 IEEE, pp. 172–176.*
Pillage et al., "Asymptotic Waveform Evaluation for Timing Analysis," 1990 IEEE, pp. 352–366.*
Rubin et al., "Electrical Modeling of Extremely Large Packages," 1997IEEE, pp. 804–809.*

* cited by examiner

*Primary Examiner*—Leigh M. Garbowski
(74) *Attorney, Agent, or Firm*—Ohlandt, Greeley, Ruggiero & Perle, L.L.P.; Daniel P. Morris

(57) ABSTRACT

A technique for simplifying a structure so that subsequent electrical analysis can be more efficiently performed. The technique includes facility to modify the existing shapes in the structure so that they do not overlap, to determine the allowed movement of each edge of each shape in the structure, to apply a set of factors to each movement that determines how advantageous the movement is with respect to the number of unknowns and the change in geometry and/or electrical parameters of the structure, and to choose and then make the movement associated with the highest factor. The factors are unity based so that the desirability of the move is given by the product of all the factors. The technique includes facility to iterate, calculating the factors and making the movement associated with the greatest factor, until the factor falls below a given threshold. The resulting structure will be similar in electrical characteristics to the original structure, yet require fewer unknowns to analyze.

12 Claims, 8 Drawing Sheets

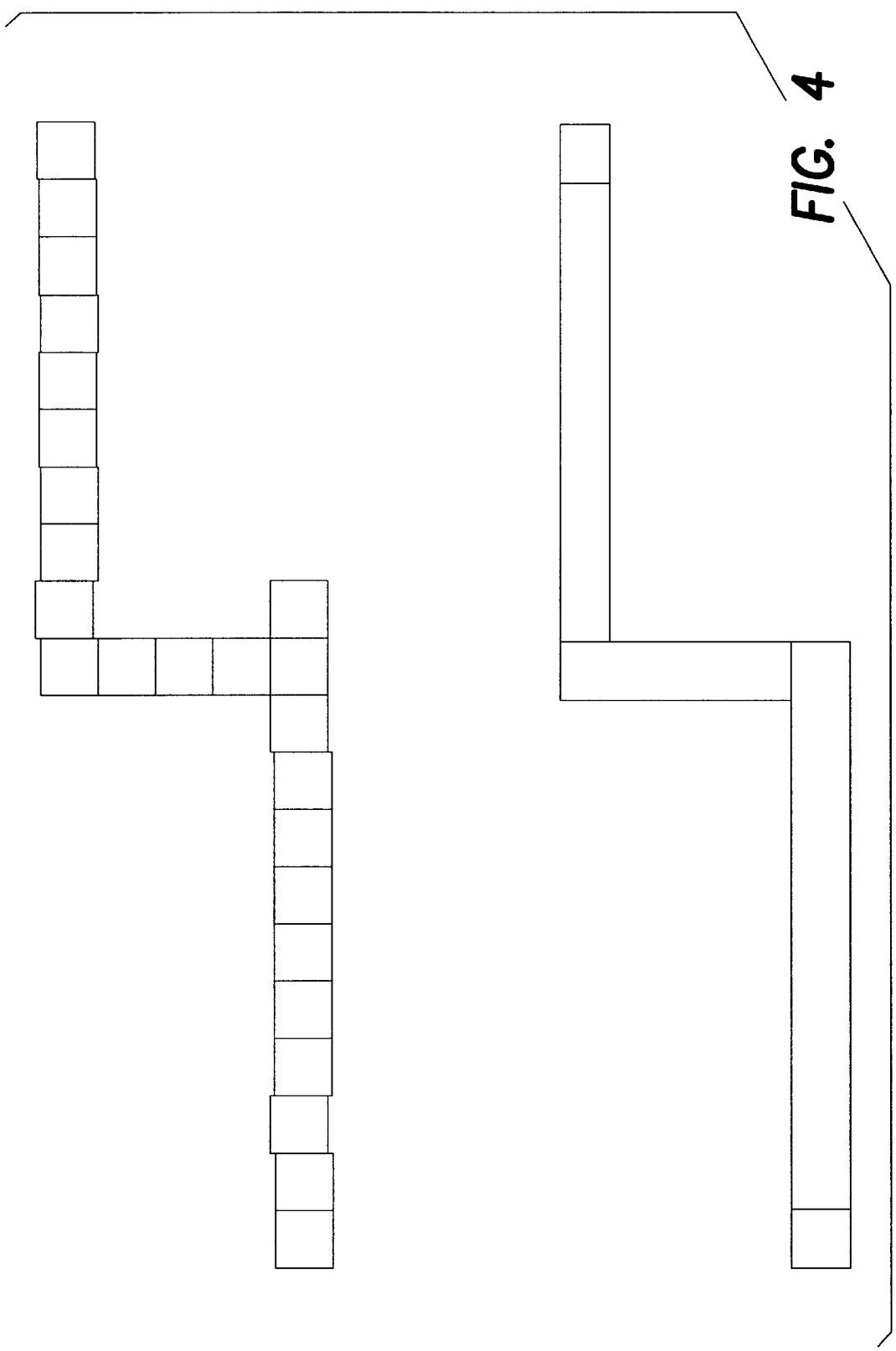

FIG. 6

TABLE 1. Cells and squares for original structure at iteration k=0

| Shape | Number of Cells | No. of Squares |
|---|---|---|
| A | 2 | 45 |
| B | 2 | 49 |
| C | 1 | 60 |
| D | 1 | 14 |
| E | 4 | 84 |

FIG. 7

TABLE 2. Factor calculated for each edge move at iteration k=1

| Edge Move | fact_N | fact_A | total factor |
|---|---|---|---|
| A_s1_out_1 | 0.833 | 0.952 | 0.793 |
| B_s1_in_1 | 1.111 | 0.962 | 1.069 |
| B_s1_out_1 | 0.909 | 0.981 | 0.892 |
| C_s1_out_1 | 0.909 | 0.936 | 0.851 |
| C_s1_out_2 | 0.833 | 0.906 | 0.755 |
| D_s3_out_1 | 0.909 | 0.981 | 0.892 |

FIG. 8

TABLE 3. Factor calculated for each edge move at iteration k=2

| Edge Move | fact_N | fact_A | total factor |
|---|---|---|---|
| D_s2_out_3 | 0.750 | 0.965 | 0.724 |
| D_s2_in_1 | 1.125 | 0.965 | 1.085 |
| D_s3_in_1 | 1.125 | 0.965 | 1.085 |

INTELLIGENT STRUCTURE SIMPLIFICATION TO FACILITATE PACKAGE ANALYSIS OF COMPLEX PACKAGES

FIELD OF THE INVENTION

This invention pertains to the packaging of electronic components, particularly to a technique for facilitating the analysis of electronic packages by reducing their structural complexity.

BACKGROUND OF THE INVENTION

The present invention relates to the electrical analysis of electronic packaging structures, such as integrated circuit chip metalization cards, printed circuit boards, modules. More specifically, the present invention relates to modifying the structure so that it retains nearly the same electric parameters, but can be analyzed more efficiently by package analysis tools (for example capacitance. resistance, or inductance analysis tools).

At present, the computational power to analyze entire, truly realistic package structures does not exist. Entire integrated circuit chips or multi-chip modules, for example, consist of millions of conductive segments. For analysis purposes, each segment corresponds to one or more unknowns in the solution matrix of a package analysis tool. This number of unknowns greatly exceeds today's computational abilities. To avoid this problem, engineers either consider small sections of the entire structure, make simplifications through omission or gross distortion of the segments, or a combination of the two.

Accordingly, it is a primary object of this invention to achieve a technique for efficient analysis of the defined package structure. This invention describes a systematic approach for simplifying an existing structure so that the number of unknowns is dramatically reduced, but without substantially changing the structure's electrical parameters. The structure is decomposed into non-overlapping elemental shapes, such as rectangles or triangles (2D or 3D) and then these shapes are modified in such fashion that the structure's topology (number of nets, for example) remains the same and the electrical properties (resistance, capacitance and inductance) change only minimally, yet the number of unknowns is significantly reduced. For example, holes in conductors, small peninsulas of conductor, or small irregularities that add complexity to the structure but have minimal effects on electrical property, might.

The problem of analyzing more complex structures has been identified and has generally been handled by having the user simplify the structure by hand, by developing techniques that allow greater numbers of unknowns, by reducing the coupling between various pieces of the structure, or by model order reduction.

In the first approach, the user continues to remove pieces of the structure until it is simple enough to be handled by the analysis tool. The problem is that the approach is not systematic—there are often so many shapes that a user may miss many simplifications or may make simplifications that have undesirable consequences. Because typical designs consist of thousands or more shapes, which overlap or make contact to each other in a variety of ways, without such a systematic approach as described here, the user would not be able to consider all the possible simplifications. Even if done properly, simplification by hand is extremely time consuming and would be difficult to apply to a large number of structures within a reasonable time period.

In the second approach, any of a variety of techniques that involve FFT or wavelets, for example, are used to allow an increase in the number of unknowns (see, for example, E. Michielssen et al, "Fast algorithms for the electromagnetic simulation of planar structures," IEEE International Symposium on Electromagnetic Compatibility, Vol. 1, pp. 172–176, 1998). Conceptually, the original physical structure is directly converted into the mathematical domain, where mathematical techniques are brought to bear on the matrix (which may not be explicitly generated) to effectively reduce the number of unknowns so that the problem can be solved. Such techniques, however, are usually selective, working on some structures and not on others. A large number of techniques would need to be developed to handle the entire set of structures most users need to analyze. The present invention will work on most structures, though perhaps the factors might need tuning to provide the most optimal results.

In the third approach, coupling between sections of the structure is omitted (see B. Rubin et al, "Electrical Modeling of Extremely Large Packages," 1997 Electronic Components and Technology Conference, pp. 804–809) so that the resulting matrix has a more block-diagonal structure, allowing a larger number of unknowns to be handled. From a circuit point of view, this simply means removing the capacitive coupling and mutual inductances between the sections so that fewer circuit elements and thus larger structures can be handled. One problem is that the coupling may be too large to be omitted, or even if done, the resulting structure is still too large. Approaches that reduce structure complexity through other means often give rise to accuracy and numerical stability problems.

In the last approach, a circuit is generated to represent the structure. Through network analysis or other techniques, a circuit model with far fewer circuit elements is generated (see L. T. Pillage and R. A. Rohrer, "Asymptotic waveform evaluation for timing analysis," IEEE Trans. on Computer-Aided Design, 9(4) pp 352–366, 1990). At present, this is still an area of scientific investigation with related issues of stability and accuracy.

The present invention relies on taking the original structure and simplifying it geometrically within known constraints. None of the prior art techniques mentioned above do this. The inventive technique does not rule out the subsequent use of the other techniques described above, but rather our invention might serve as a first step of simplification. The other techniques could be applied after the simplification to allow an even larger number of unknowns. This problem of reducing structure complexity in a systematic way, which is the basis of this invention, has received little attention on the outside.

SUMMARY OF THE INVENTION

The structure to be simplified will be referred to as original structure. The first step is to modify the shapes so that they continue to fully represent the structure but do not overlap; the shapes may be isolated, or may touch other shapes. Shapes conventionally used in package analysis such as rectangles, triangular prisms, tetrahedrons, can be handled as can shapes with zero thickness. For understanding purposes only, we assume that the structure is stratified in the z direction, consistent with card and other package structures. Thus, we assume the structure consists only of 3D rectangular shapes lying in the xy plane, with thickness in the z direction. It is to be understood that this invention does apply to more general shapes.

Accordingly, the primary feature of the present invention resides in the technique or process (as well as the means involved) for creating a new geometrical representation of an electronic package comprising: entering shapes that define the structure of the electronic package; modifying the shapes so that they do not overlap; for each edge of each shape, determining moves that neither alter structure topology, nor violate user directives, nor overlap other shapes; finding unity-based factors for each move; finding a move that gives maximum product of unity-based factors; obtaining the products of the factors and, if greater than one, continuing the process, otherwise discontinue; and if continuing the process, moving edge and thus defining the new structure.

In a specific form, the inventive process also includes: generating a set of non-overlapping shapes that represent the said electronic package; generating a table of all the allowed moves of the edges of each said shape so that the move does not result in the overlap of any shapes and does not cause shapes in different nets to touch each other; generating a set of subfactors that give the desirability of each of the said edge movements; generating a total factor that is the product of the above said subfactors; performing a set of iterations whereby the greatest factor associated with all the said edge movements is determined and the said shape is modified according to the said edge movements; and stopping the process, depending upon the crossing of the said total factor below a user defined threshold.

The foregoing and still further objects and advantages of the present invention will be more apparent from the following detailed explanation of the preferred embodiments of the invention in connection with the accompanying drawing.

BRIEF DESCRIPTION OF THE DRAWINGS

FIG. 4 shows a more realistic example; the original structure is on top and the modified structure is on the bottom.

FIG. 6 gives the number of grid cells and the area in squares for each of the five shapes in FIG. 3B.

FIG. 7 gives the subfactors and overall factor for some of the allowed edge movements for the first iteration of the algorithm.

FIG. 8 gives the subfactors and overall factor for some of the allowed edge movements for the second iteration of the algorithm.

DESCRIPTION OF THE PREFERRED EMBODIMENTS

Figure 1:
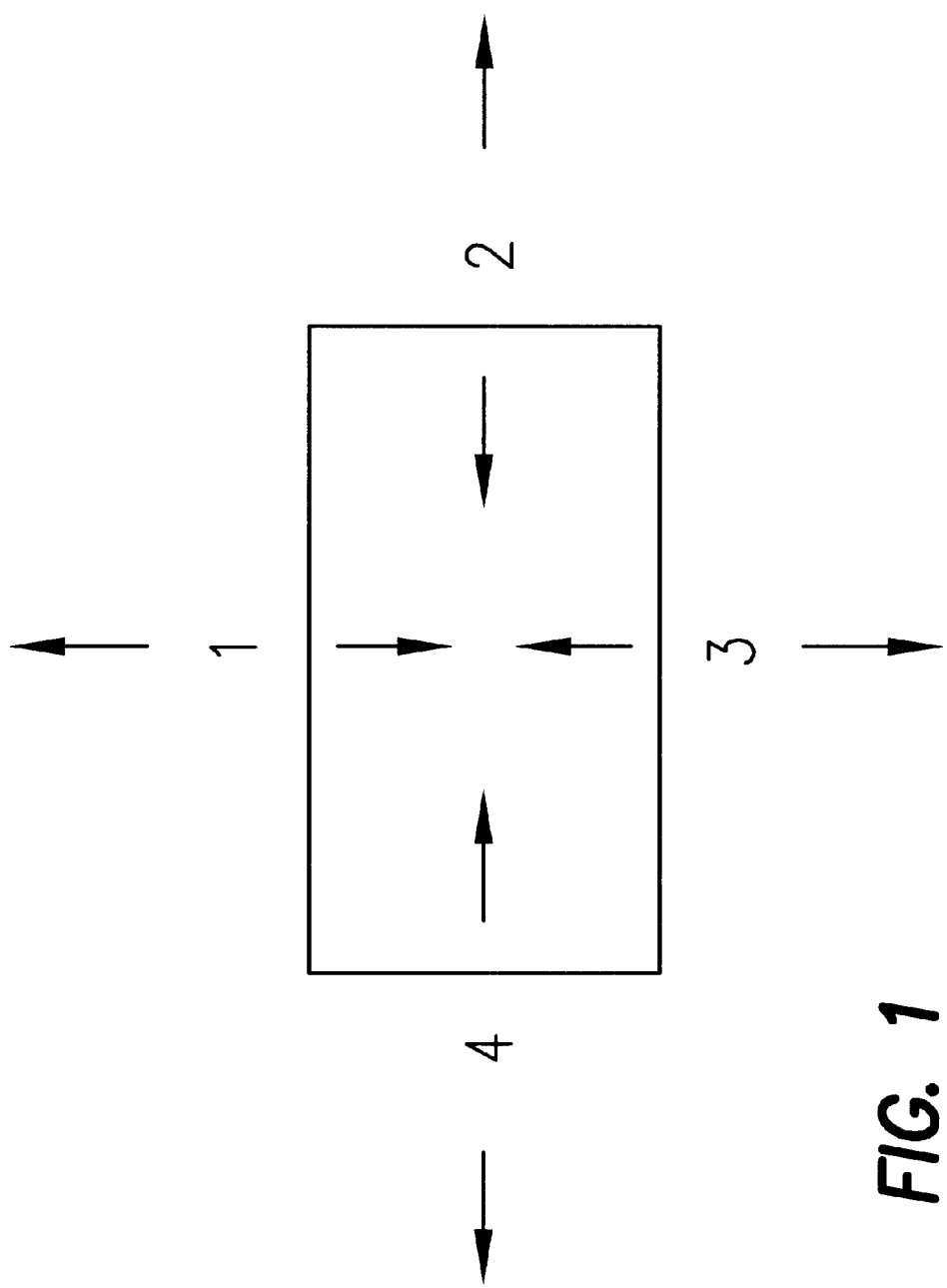
FIG. 1 shows the four sides of a rectangular shape viewed in the xy plane, with labels for the edges and their possible moves in the inward or outward direction.

The essential idea, in accordance with the invention, is that once the structure is decomposed into non-overlapping shapes, the edge of any shape can be moved, provided that the edge, once moved, does not overlap any other shape or violate other (to be described) constraints. By considering each edge of each shape, we can determine if the movement of an edge to a new allowed position will result in a change in the number of unknowns. We assign a value to the edge movement that reflects the change in the number of unknowns and the change in geometry and/or electrical parameters that accompany the change. The higher the factor, the more favorable the move. The lower the factor, the less desirable the move. A high factor is associated with a move that decreases the number of unknowns but does not significantly change the electrical parameters of the package.

We attribute an overall factor to each possible move for each edge of each side of each shape in the structure. We then pick the move with the highest factor, make the indicated move, and then re-evaluate the factors. After each iteration, we check, two at a time, touching shapes to see if they can be combined into a single shape; for example, two rectangles that have a common, touching side of the same length may be combined into a single larger rectangle. We may decide to combine the shapes into the single larger shape, or leave the shapes as they were. We continue to iterate, finding the edge move associated with the highest factor and then making the modification, until the highest factor is below our threshold. The resulting structure is topologically and electrically similar to the original structure, but requires a reduced number of unknowns for subsequent analysis.

Constraints in Moving Edges

Before the first edge is moved, the structure is analyzed topologically to determine which conductors are touching. Each set of touching shapes is called a net. Thus, we find the number of nets and determine which shapes are in each net.

a) The edge, after movement, cannot overlap any other shape. Such a movement would serve no useful purpose here, since our initial decomposition into non-overlapping shapes facilitates the calculation of the factors.

b) The edge, after movement, cannot touch any shape that is in a different net. Such touching would cause a short between nets that is generally undesirable from a circuit designer's point of view.

c) The net associated with the edge moved cannot disappear as a result of the move, nor should a cross-sectional slice of the net have zero width. This means that a net represented by a signal line cannot snake down to zero width at some point in its length. Such a zero width region represents a singularity, since the resistance through a shape that has zero thickness in the xy plane is infinite. However, this snaking to zero width could be allowed through an override in the algorithm, if the user of the algorithm so desires.

d) Non-overlapping shapes may touch at points, or along lines or areas (touching along areas represent the touching of two rectangles along their sidewalls). Touching of 3D shapes along a line may or may not be desirable, depending upon the type of package analysis subsequently performed. It is generally not desirable to have shapes touch at points, since a point contact represents a singularity (the current density goes to infinity at a point). However, there are many design tools that allow such point contacts. With regard to this invention, it is possible to allow point contacts and even preserve them through the modifications, or remove them, making the shapes either isolated or modify them so that they make contact along a line or area. We will assume that such features to allow and/or change such point contacts will be included in the invention, but can be enabled or disabled, depending upon user preferences.

Factors Governing the Desirability of Edge Movement

The overall factor will generally consist of a number of subfactors that are multiplied together. Subfactors may be based on many parameters and we describe several. Though there are many possible subfactors, each subfactor ideally should have the following properties.

a) If the edge movement results in no change to the parameter, the subfactor should have value unity.

b) If the edge movement is desirable, the factor should increase from unity and the increase should be dependent on how much more desirable the resulting structure becomes. For example, a slightly desirable movement might give a subfactor of 1.01, while a very desirable movement might give a factor of 10.

c) If the edge movement is undesirable, the subfactor should move toward 0, with the more undesirable the movement, the closer to 0. For example, a slightly undesirable movement might give a factor of 0.99, while a highly undesirable movement might give a factor of 0.01.

The advantage of these unity based factors is that the total factor, which is the product of these factors, is also unity based. Because the factors are unity based, it would only be necessary to raise the factor to a different power, n, where n is either an integer or real number, to accentuate the effect of the factor. A zero exponent would remove the effect of the factor (the factor becomes unity), while a negative factor would invert the effect of the factor.

At each iteration step, the final factor is determined for each allowed edge position for each edge of each shape in the structure. Iterations will generally continue if the highest factor among all edges of all shapes is greater than unity or some other user defined threshold. The iterations, however, may also be allowed to continue even though the total factor is less than unity. For example, the solution might be caught in a local minima. One could allow the iterations to continue for a few steps, or include an additional subfactor, based on a random number generator that could be included to allow the solution to move beyond the local minima.

During any stage in the iterations, touching shapes may be combined to form larger shapes, and this may reduce the number of unknowns associated with the structure. It is not clear that such combining of shapes will always lead to the optimal solution, so the feature to combine could be turned off by the user.

Types of Subfactors

We now describe a number of possible subfactors. To aid in describing the subfactors, we define a rectangular grid for the structure. Each rectangular shape in the structure is associated with six grid planes; one for each of the four sides (two grid lines along x and two along y), and two along z that define the shape's thickness. Though these grid planes extend throughout all space, we will view our structures in the xy plane where these planes appear as lines. Thus, we will call them grid lines. Because many of the rectangles are expected to share grid lines, we consider only the distinct grid lines. In the following, we will use the terms subfactor and factor interchangeably.

An elemental grid cell in the xy plane corresponds to the rectangle formed by two adjacent x grid lines and two adjacent y grid lines. An elemental grid cell volume corresponds to the 3D rectangle formed by two adjacent x grid lines, two adjacent y grid lines, and two adjacent z grid lines. A shape that covers 11 x grid lines, 5 y grid lines and 3 z grid lines has a volume of 10*4*2 or 80 grid cell volumes. We will call an elemental grid cell volume either a grid cell or simply, a cell.

The factors may be based on the following.

a) The number of grid cells. As we soon show, the number of unknowns required for an analysis is related to the number of grid cells. A decrease from the value at the current step in the iteration process gives a factor greater than unity and an increase gives a factor less than unity.

b) The number of distinct grid lines. Though the number of grid lines is only indirectly related to the number of unknowns, a reduction in the number of grid lines usually gives rise to a simpler-looking structures and fewer unknowns. A decrease from the value at the current step in the iteration process gives a factor greater than unity and an increase gives a factor less than unity.

c) The correlation between the resulting structure after iteration k and the original structure. For two structures in the xy plane, a high correlation means that the structures overlap to a large extent. If the structure correlates to a greater degree after the edge move, the factor is greater than unity. If it correlates less, the factor is less than unity.

d) The relative change in area of the shape associated with the edge moved. If there is a big change in the shape area, the factor is much less than unity. If the change is slight, it is just slightly less than unity. This subfactor tends to restrict changes in shapes to smaller ones.

e) The area of the entire structure or of the individual nets. If the area changes in such a direction that the change is desirable (the area moves closer to the original area), the factor is greater than unity. If the area moves in the wrong direction, the factor is less than unity. Clearly, for the first iteration, any edge move must change the area. Since the area moves in a direction away from the original area, the subfactor for the first move is always less than unity. However, after the initial iteration, any subsequent change (in a later iteration) that moves the area closer to the original area gives rise to a subfactor value greater than unity.

f) A package parameter such as inductance, capacitance, or resistance of the structure or of the net associated with the edge to be moved. Because the calculation of a parameter for the entire structure would be computationally expensive, or perhaps a very simplified version of the structure or part of the structure, it would most likely be a calculation only for part of the net associated with the edge to be moved.

Figure 5:
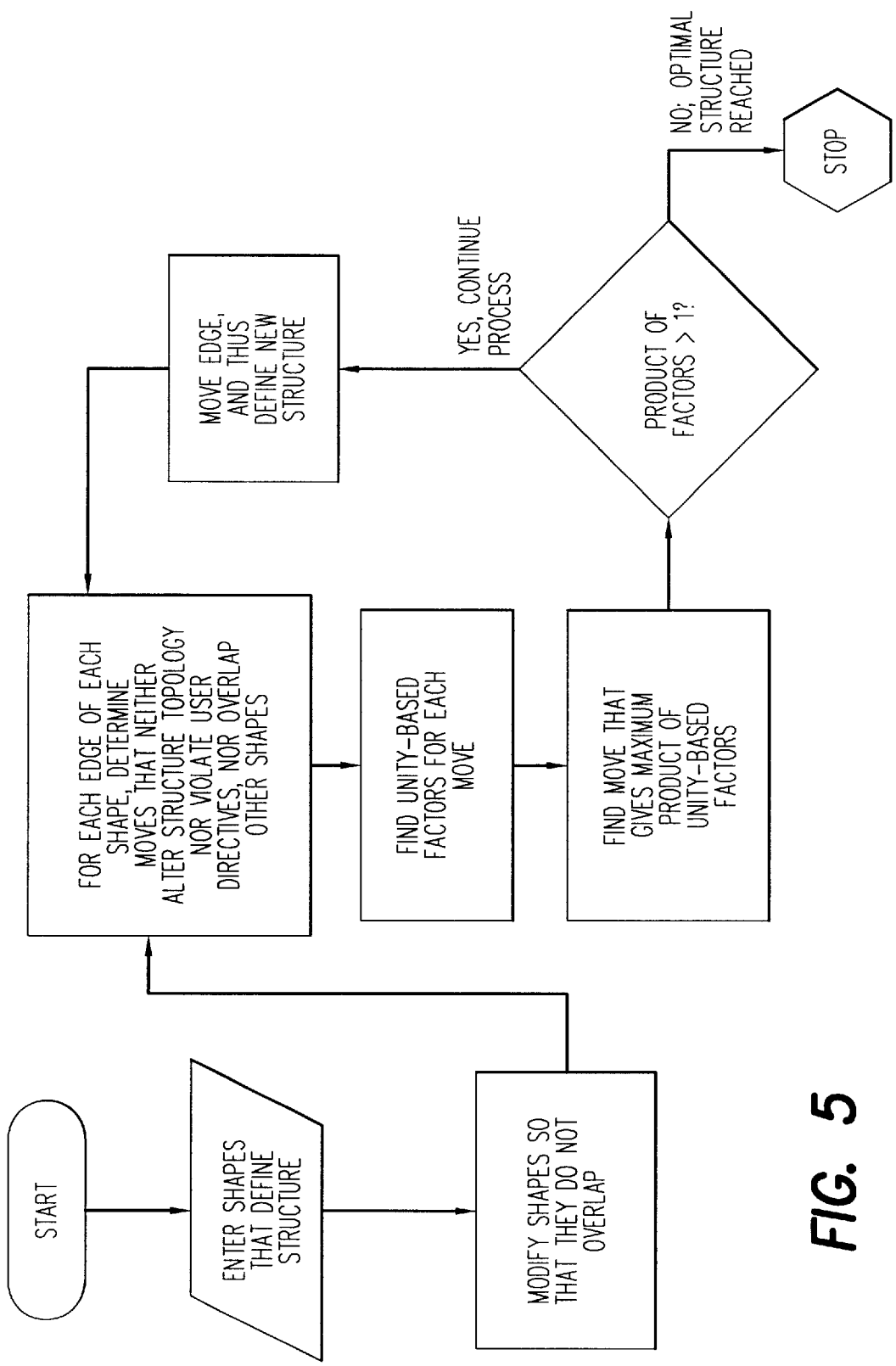
FIG. 5 is a flow chart depicting the basic underlying process of the invention.

The underlying process in accordance with the present invention is shown in FIG. 5 as will be seen the steps or operations of this process will:

enter shapes that define structure;

modify shapes so that they do not overlap;

for each edge of each shape, determine moves that neither alter structure topology nor violate user directives, nor overlap other shapes;

find unity-based factors for each move;

find move that gives maximum product of unity-based factors;

give product of factors>1 or move edge and thus define new structure.

As an example of the above noted process, we will consider a simple structure consisting of five coplanar rectangles having the same thickness and situated in the xy plane. In describing the allowed edge movements, refer to FIG. 1, where the four sides of a rectangle are labeled. Allowed moves may occur at edges 1, 2, 3, or 4 and may be in the outward direction (so rectangle projection in xy plane increases in area) or inward (so rectangle area decreases).

Figure 2:
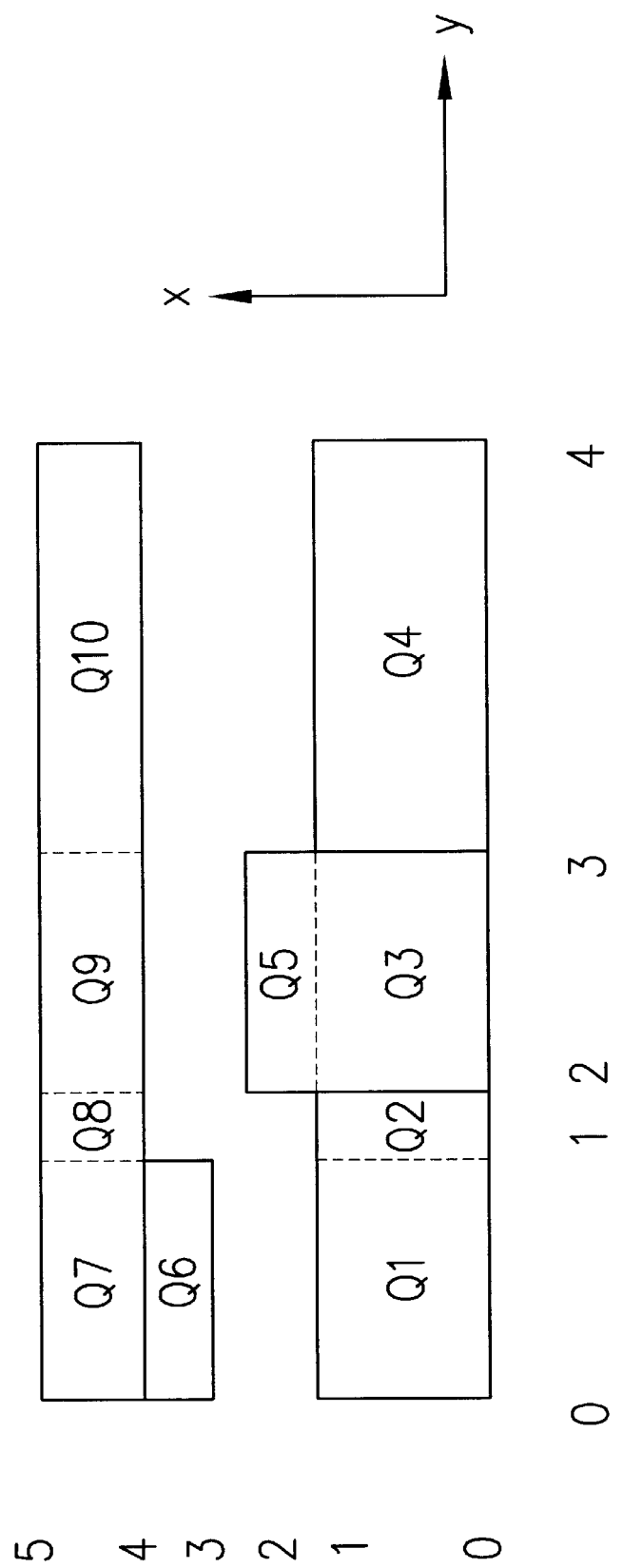
FIG. 2 shows an example that contains two nets formed by five shapes, the grid lines along the x and y directions, and the unknown charges required for a capacitance calculation.

The original structure is shown in FIG. 2. It consists of five shapes, defined by heavy solid lines. The region containing the shapes consist of five grid lines along the x direction and six grid lines along the y direction. The grid lines in the z direction are not shown. Let us assume that a capacitance analysis (see R. F. Harrington, *Field Computation by Moment Methods*, Macmillan Publishing Co., New York, 1968) is to be performed after the simplification. In such an analysis, the structure is parsed into subsections and an unknown charge is assumed for each subsection. We assume that the thickness of the structure is sufficiently small that it may be considered zero thick for the purposes of capacitance analysis. After application of appropriate boundary conditions, such as the applied voltages, the charges are determined the capacitance is calculated from the applied voltages and the calculated charges. Consistent with our discussion earlier, the subsections correspond to the grid cells.

The cells (subsections) are individually labeled Q1 through Q10, where for example, Q5 refers to the charge supported on the conductor region associated with each grid cell 5. Though it is possible to perform a capacitance analysis using only five unknowns, namely one for each of the five shapes, it is often better to use a finer subsectioning because of interactions between nearby conductors that jut out or make the overall conductor irregular in shape. For example, because the conductor regions associated with Q5 and Q6 jut out and come in close proximity to other sections of the conductor, it is wise to more finely subsection the structure so that it includes subsections Q2 and Q8. In other words, irregular aspects of the conductor cause a more non-uniform charge distribution that requires a subsectioning finer than represented by the shapes themselves. Thus, we assume that the number of unknown charges is not equal to the number of shapes, but rather more conservatively given by the number of grid cells. We assume that similar arguments apply for inductance and/or full-wave analysis, where similar interactions between irregular shapes exist.

Figure 3A:
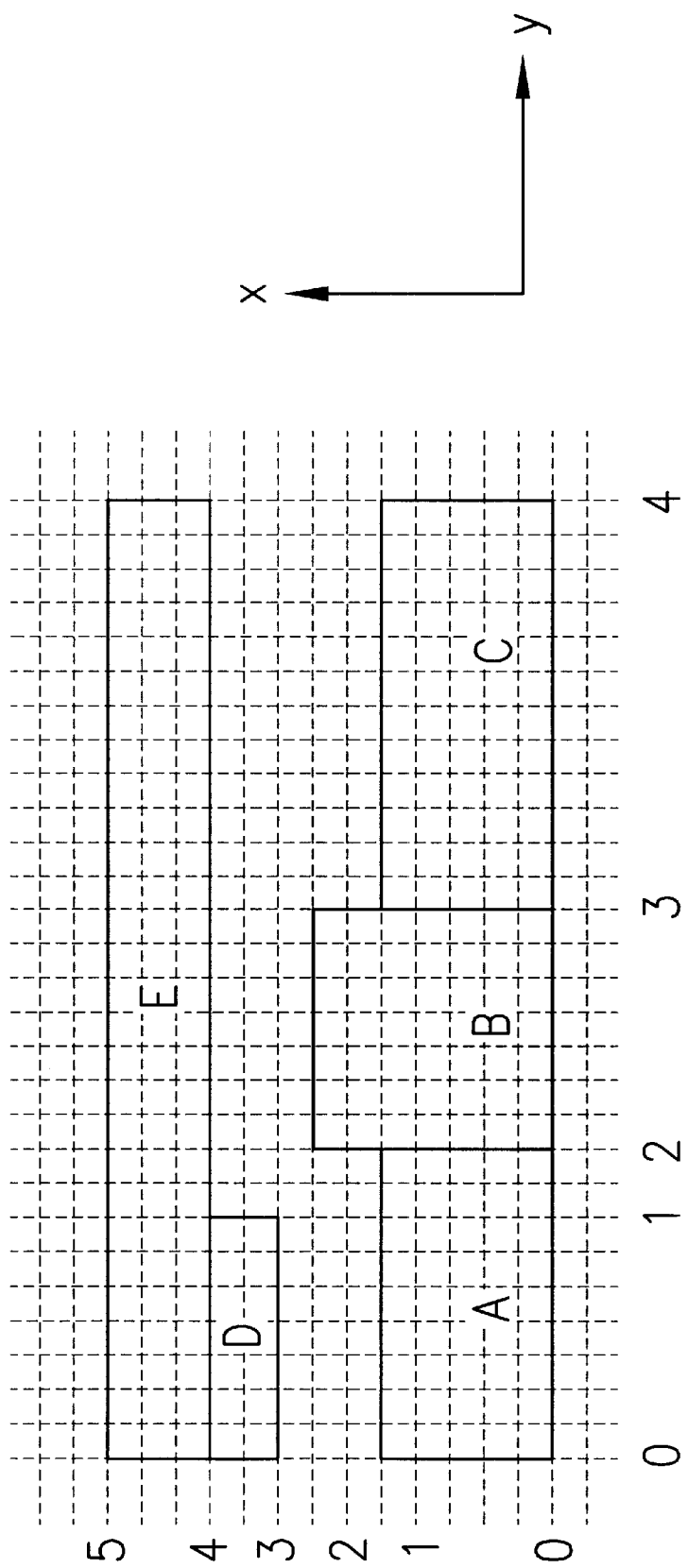
FIG. 3A shows the example structure with the five shapes labeled and overlaid by a uniform grid of lines that aids in the determination of the area of the structure in the xy plane.

In FIG. 3A, we label the five shapes A, B, C, D, and E. We label the x grid lines 0 through 4 and the y grid lines 0 through 5. The two z grid lines are not shown. A finer, uniform grid is then superimposed over the structure so that the area may be calculated for the different shapes through inspection. Topologically, rectangles A, B, and C form net 1 and rectangles D and E form net 2. This example represents an extreme simplification of the more practical structures in package analysis, with shape dimensions and relations chosen for the purposes of explanation only.

We will assume only two subfactors; the first is the number of grid cells formed by the entire structure and the second is the area of the entire structure. A move that reduces the number of cells will cause the first subfactor to increase from unity. A move that changes the total area of the structure so that it comes closer to the original area will cause the second factor to increase from unity.

For the first subfactor we use fact_$N=N_k/N_{k+1}$, where $N_k$ is the number of cells in the structure at iteration k and $N_{k+1}$ is the number of cells at iteration k+1. Notice that if the number of cells does not change, the factor is unity. If it decreases the factor is greater than unity.

For the second subfactor, we use $$Fact\_A = \{(1+d)/[|1-(A_{k+1}-A_k)/(A_0-A_k)|+d]\}^{|1-A_k/A_0|}$$
$$\text{for } A_0 \neq A_k$$
$$= (1/2)^{|A_{k+1}/A_0-A_k/A_0|}$$
$$\text{for } A_0 = A_k,$$

where $A_k$ is the area of the structure at iteration k, $A_{k+1}$ is the area at iteration k+1, and $A_0$ is the original area (at iteration 0). d is an amplitude control constant that we will set at 0.1 for this example. This subfactor has the following desirable properties. The factor is unity when the area remains the same from iteration k to iteration k+1. It is greater than unity if the area at iteration k+1 moves closer to the original area. Further, because of the exponent, if the difference of the present area and the original area is small, the subfactor will tend to be closer to unity. We now apply the iteration algorithm to the structure shown in FIG. 3A. Though it is our original structure, FIG. 3A could represent a section of a more complex structure obtained after a number of previous iterations.

The number of cells for each shape is given in the Table 1. For shape B, which runs between two grid lines along x (grid lines 2 and 3) and three grid lines along y (grid lines 0, 1 and 2), the number of cells is 2. The total number is 10 cells. Since we have assumed that the number of unknowns is related to the number of grid cells included in the structure, this structure at present requires 10 unknowns to analyze.

The area for the shapes will be given in squares, based on the overlaying dashed lines in FIG. 3A. For example, shape A consists of a 9-by-5 array of little squares, so its area is 45 squares. The total area is 252 squares. Note that the area subfactor, fact_A is unity if area remains at 252 squares from iteration k=0 to iteration k=1.

We now apply the algorithm using N0=10 and A0=252 (the number of unknowns and area for the original structure, at iteration k=0). We first determine the allowed edge moves, determine the factor associated with the moves, and then make the move associated with the highest factor. We will label the change as follows. The shape will appear first, then the side number (from FIG. 1), the direction (either in or out), and the number of grid positions moved. For example, if shape D, side 3 can move outward by 1 grid position, we will call that move D_s3_out_1.

Some of the allowed changes are A_s1_out_1, B_s1_in_1, B_s1_out_1, C_s1_out_1, C_s1_out_2, and D_s3_out_1, and these moves, along with their subfactors and total factor are given in TABLE 2. Some of the other edge moves are either duplicates (have the same effect such as C_s1_in_1 and C_s2_in_1, which are not shown in the table), result in nets touching (such as D_s3_out_2 causing nets 1 and 2 to short) or cause shapes to overlap (such as A_s2_out_1 making shapes A and B overlap). We have chosen not to consider E_s4_in_1 because that would have led to a line contact (line in z direction but a point in the xy plane) between shapes D and E, though some users might have preferred to allow this to happen. We have also assumed that edges at the outer boundaries cannot move outward, so that E_s1_out_1 is not permitted. Only some of the inward moves are shown. For instance, the move E_s2_in_1, E_s2_in_2 and E_s2_in_3 are allowed but not included in TABLE 2 to simplify the example. We examine TABLE 2 and determine which move is associated with the largest factor.

Figure 3B:
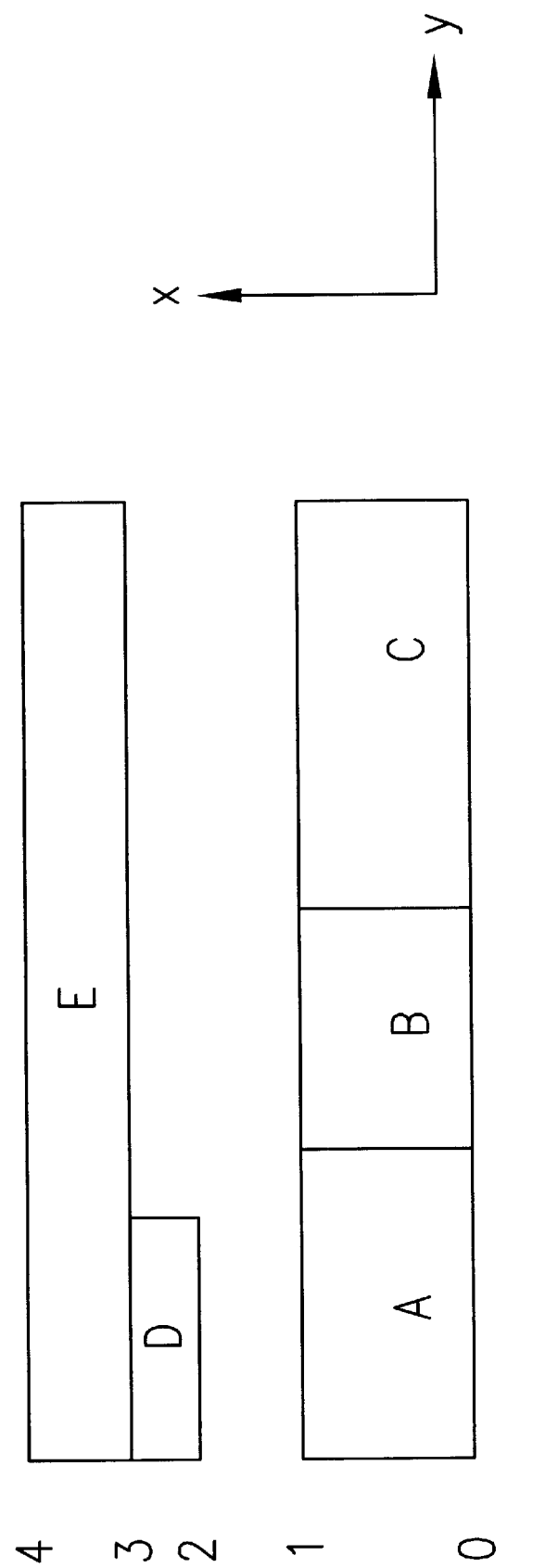
FIG. 3B shows the example structure after the first iteration of the algorithm is performed.

Move B_s1_in_1 leads to a reduction in the total number of cells from 10 to 9 and gives a fact_N=1.111, but decreases the area by 14 squares from 252 squares to 238 and gives fact_A=0.962. The overall factor is 1.069, which turns out to be both greater than unity and the most favorable move in TABLE 2. We move the edge according to B_s1_in_1 and the structure becomes that shown in FIG. 3B.

For the next iteration, where k=2, the present area Ak=238 squares. The present number of cells (or unknowns) is 9 because the previous move, B_s_in_1, reduced the number by one. We will now investigate only two possible edge moves, to simplify the example, and generate TABLE 3. Notice that D_s2_in_1 and D_s3_in_1 are equivalent, since they yield the shape after the move.

Figure 3C:
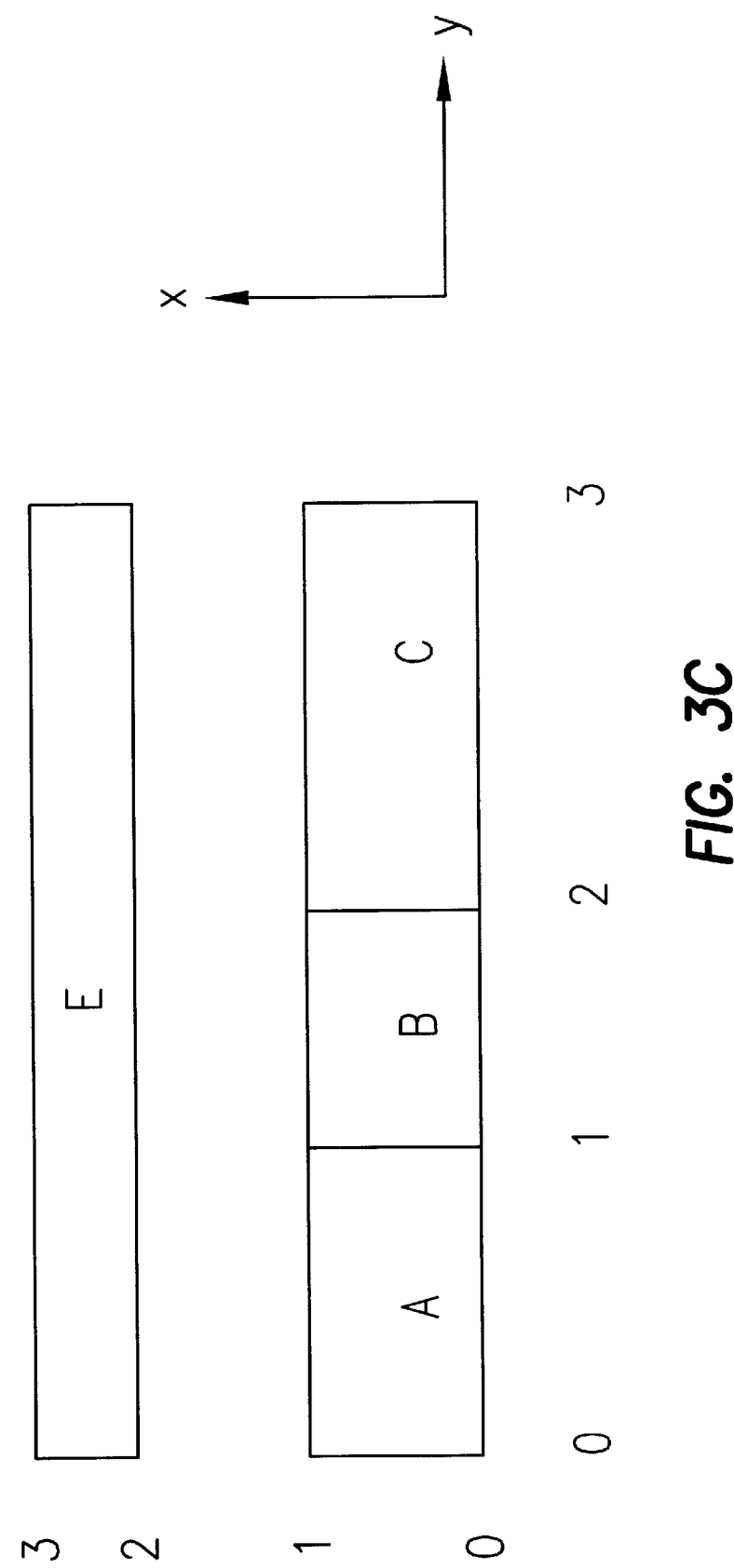
FIG. 3C shows the example structure after the second iteration of the algorithm is performed.

The most favorable move is D_s2_in_1 or D_s3_in_1, which yields 8 cells and an area of 224 squares. Notice that the number of y grid lines has been reduced from 6 to 5 with the removal of shape D. Assuming that we stop the iteration process at this step (instead of continuing until the greatest factor is less than unity), we have reduced the number of unknowns by 2, which corresponds to 22.2% by increasing the area from 252 squares to 224 squares, or 11.1%. The structure has remained topologically the same, consisting of two nets, but is clearly more simple as shown in FIG. 3C. If combining of adjacent, touching shapes into larger shapes is allowed, then shapes A, B, and C may be combined into one larger rectangle. After this change, the x grid lines 1, 2, 3 and 4 could be removed, with the result that only two rectangles remain, each situated between only two grid lines along x and two grid lines along y. Thus, the number of cells becomes 2 and thus only 2 unknowns are needed to analyze the structure.

It must be recognized that, depending upon proximity of these shapes to other shapes and the size of these shapes with respect to the wavelength, and depending upon what kind of analysis is required (capacitive, inductive, or full-wave electromagnetic), these shapes may ultimately be further gridded to assure accuracy. In other words, the preprocessing represented by this invention may not be the final step in the analysis procedure. Rather, it provides a simplification of the structure to a subsequent package analysis tool, and that tool may have other requirements on the gridding that would have to be met.

Another Example

FIG. 4 shows (top) a set of conductive rectangular shapes that forms one contiguous body. At the bottom of FIG. 4 is the modified structure, obtained from the application of a computer code written to perform the algorithm described in the invention. The computer codes includes additional sub-factors not described above.

As can be seen from FIG. 4, the rectangles of the original shape are not well aligned, and this gives rise to many grid lines and a significant number of grid cells and thus unknowns. The original structure consists of 25 rectangles. The two rectangles at the opposite ends of the structure are intended to be areas of contact for the net (for example, probe points for a measurement), and the algorithm has been further constrained to assure that these contacts are only minimally altered. The application of the computer code generates a modified structure that consists of only 5 rectangles, and they are aligned and yield many fewer grid lines. Based on the approximation of unknowns described in the original disclosure, the original structure requires 161 unknowns for subsequent package analysis, while the modified structure requires only 7 unknowns. Though a large savings in the number of unknowns has been obtained, the structures still look very much alike. A package analysis, for example an inductance calculation, would be expected to show results for these structures that are nearly the same.

We call this a more practical example because it shows less exaggerated offsets than the example in the disclosure, yet may not truly represent the contents of an actual design for a product. It does, however, demonstrate the offsets in typical designs that do not dramatically change the package characteristics, but greatly increase the computational cost of subsequent analysis. The underlying process of the present invention is shown in FIG. 5. The individual steps, however, may be modified to account a different overall factor threshold, or different user preferences, constraints and requirements.

Related Issues

Prior to first step of removing the overlaps between shapes, it may be advantageous to subdivide the shapes so that shapes only run between two adjacent grid lines; for structures consisting primarily of shapes that lie in the xy plane, we refer to this part of the process as stratifying. This subdivision generally provides greater flexibility in edge movements, and thus is expected to lead to a more optimal solution. For example, if a rectangle that runs between z grid lines 1 and 2 is adjacent to a second rectangle that runs between z grid lines 1 and 3, these shapes cannot be combined into a simpler rectangle even though the side that they share has the same length. But if rectangle 2 is subdivided into a rectangle that runs between z grid lines 1 and 2, and a second rectangle that runs between z grid lines 2 and 3, the two rectangles between z grid lines 1 and 2 can be combined, and the rectangle between z grid lines 2 and 3 will be free to interact with the other rectangles that run between z grid lines 2 and 3. Once the iterations are completed, the resulting rectangular shapes can be appropriately merged in the z direction.

Additional factors may be added to further constrain the final solution. By adjusting the exponent of each factor or otherwise changing the factors, it is possible to steer the solution so that it better satisfies the requirements of the users. For example, it is possible to preserve openings in conductive regions or to allow them to be closed. It is possible to remove peninsulas of conductor, such as unconnected stubs on a signal line, if this is desirable. It is possible to mark certain shapes as critical, so that they are not modified. It is possible to link certain shapes so that they would change in unison—for example, a differential signal line pair may be included in a structure, and it may be desirable to keep the lines as similar as possible to maintain appropriate symmetry.

The simplification algorithm may contain other user-helpful features such as attributing a particular color to various shapes or to nets that have either been significantly modified or left unchanged. Preconditioning of the structure may be done to correct for defects in the initial design, where tiny, unintended gaps may exist between various shapes. Such preconditioning, based on user adjustable parameters, could automatically move shapes and close up gaps so that shapes that were clearly intended to form contiguous nets would do so.

The algorithm may be run a number of times, each with different factors or factor weights, and the user may then select the resulting structure that best suits the needs. Because all edge moves keep the structure topologically correct, i.e., nets remain intact and not touching other nets, all structures represent viable opportunities to run with reduced number of unknowns. Analyses may be done on a number of resulting structures so that the user obtains a feeling the difference in results and the savings in computational effort.

Finally, as mentioned earlier, this invention is not limited to rectangular shapes, but may be performed using similar factors on a wide variety of different shapes. A design might consist of, for example, rectangles, triangles and other polygons. After generating a set of shapes that do not overlap but still represent the original structure, factor would be generated and the iteration process continued until the greatest factor were unity or crossed a user defined threshold. This technique is not limited to electrical parameters, but could be adapted to simplify structures for a number of other applications.

The invention having been thus described with particular reference to the preferred forms thereof, it will be obvious that various changes and modifications may be made therein without departing from the spirit and scope of the invention as defined in the appended claims.

What is claimed is:

1. A process for creating a new geometrical representation of an electronic package comprising:

entering shapes that define the structure of the electronic package;

modifying the shapes so that they do not overlap;

for each edge of each shape, determining moves that neither alter structure topology, nor violate user directives, nor overlap other shapes;

finding unity-based factors for each move;

finding a move that gives maximum product of unity-based factors;

obtaining the products of the factors and, if greater than a threshold, continuing the process, otherwise discontinue; and if continuing the process, moving edge and thus defining the new structure.

2. A process, as defined in claim 1, wherein the steps include the following:

generating a set of non-overlapping shapes in a plurality of nets that represent the electronic package;

generating a table of all the allowed moves of the edges of each said shape so that the move does not result in the overlap of any shapes and does not cause shapes in different nets to touch each other.

3. A process, as defined in claim 2, further comprising:

generating a set of subfactors that give the desirability of each of the said edge movements.

4. A process, as defined in claim 3, including the step of generating a total factor that is the product of all of the above subfactors.

5. A process, as defined in claim 4, including the further step of performing a set of iterations wherein the greatest total factor associated with all the said edge movements is determined and the shape is modified according to the edge movement.

6. A process, as defined in claim 5, including stopping the process, depending upon the crossing of the total factor below a user defined threshold.

7. A system for creating a new geometrical representation of an electronic package comprising:

means for entering shapes that define the structure of the electronic package;

means for modifying the shapes so that they do not overlap;

for each edge of each shape, means for determining moves that neither alter structure topology nor violate user directives, nor overlap other shapes;

means for finding unity-based factors for each move;

means for finding a move that gives maximum product of unity-based factors;

means for obtaining the products of the factors and, if greater than one, continuing the process, otherwise discontinue; and if continuing the process, means for moving edge and thus defining the new structure.

8. A system, as defined in claim 7, wherein the system further includes the following:

means for generating a set of non-overlapping shapes that represent the electronic package;

means for generating a table of all the allowed moves of the edges of each said shape so that the move does not result in the overlap of any shapes and does not cause shapes in different nets to touch each other.

9. A system, as defined in claim 8, further comprising:

means for generating a set of subfactors that give the desirability of each of the said edge movements.

10. A system, as defined in claim 9 further comprising:

means for including the step of generating a total factor that is the product of all of the above subfactors.

11. A system, as defined in claim 10 further comprising:

means for including the further step of performing a set of iterations, wherein the greatest total factor associated with all the said edge movements is determined and the shape is modified according to the edge movement.

12. A system, as defined in claim 11 further comprising:

including means for stopping the process, depending upon the crossing of the total factor below a user defined threshold.

* * * * *